May 5, 1953
F. C. ALBRIGHT
2,637,512
AIRCRAFT UNDERCARRIAGE
Filed Dec. 7, 1951
2 SHEETS—SHEET 1
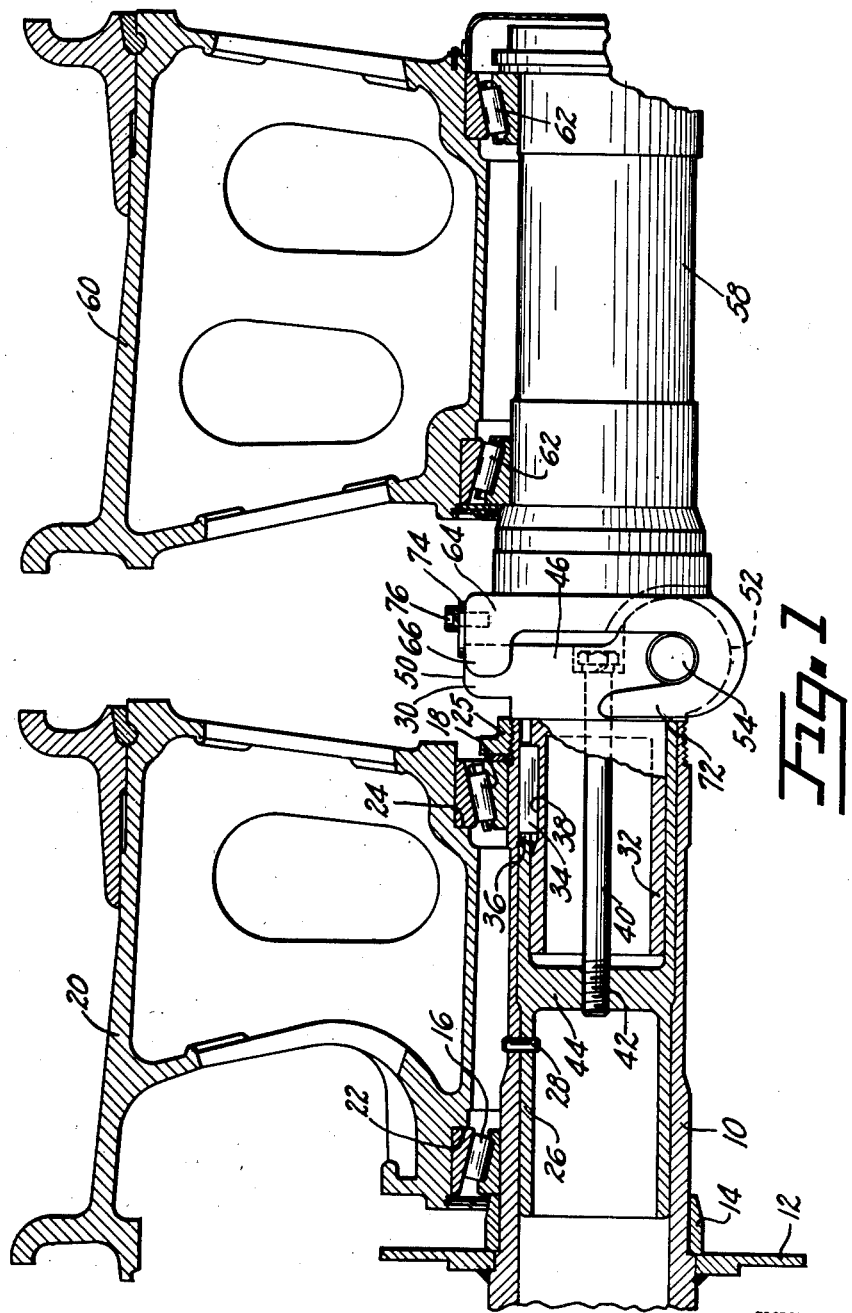
INVENTOR.
FRANKLIN C. ALBRIGHT
BY
*G. A. Gust*
ATTORNEY May 5, 1953  F. C. ALBRIGHT  2,637,512
AIRCRAFT UNDERCARRIAGE
Filed Dec. 7, 1951
2 SHEETS—SHEET 2
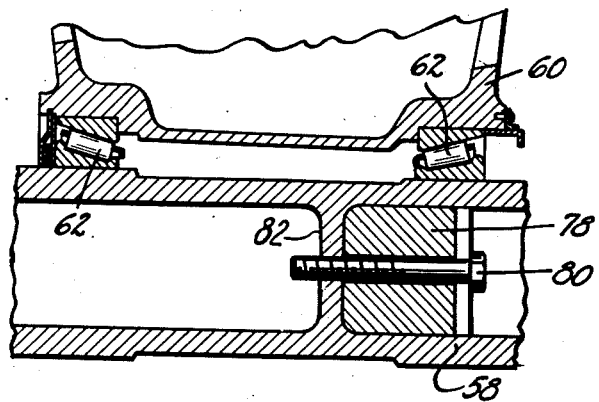
Fig. 4
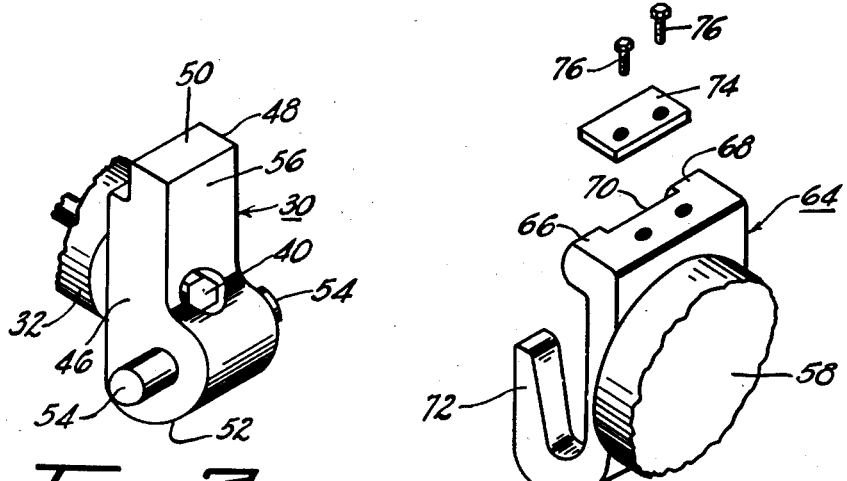
Fig. 2
Fig. 3
INVENTOR.
FRANKLIN C. ALBRIGHT
BY
G. A. Gust
ATTORNEY Patented May 5, 1953

2,637,512

UNITED STATES PATENT OFFICE 2,637,512

AIRCRAFT UNDERCARRIAGE

Franklin C. Albright, South Bend, Ind., assignor to Bendix Aviation Corporation, South Bend, Ind., a corporation of Delaware Application December 7, 1951, Serial No. 260,489

12 Claims. (Cl. 244—103)

The present invention relates to an undercarriage intended primarily for use on aircraft and more particularly to the arrangement of auxiliary load-carrying means which may be detached from the aircraft after its load-carrying function ceases.

A principal object of this invention is to provide auxiliary or reinforcing landing gear structure arranged to support a proportional share of the total load carried by the complete undercarriage assembly and capable of being released from its supporting connection with the aircraft.

Another object is to provide an auxiliary ground-engaging landing gear part which supports a proportional part of the total aircraft weight and which may be released from supporting attachment with the aircraft once the latter has become air-borne.

A further object is to provide a multiple wheel undercarriage assembly in which certain of the wheels are detachably coupled to the principal or permanent part of the undercarriage in such a manner that they provide auxiliary support for the principal wheels during take-off and may be physically detached from the aircraft upon its becoming air-borne.

A still further object is to provide a dual wheel landing gear assembly in which one of the wheels is detachably supported on the axle structure of the other wheel and carries part of the total load imparted to the assembly, said one wheel being detached from the other part of the assembly when the aircraft takes-off thereby lightening the air-borne load of the aircraft.

Other objects will become apparent as the description proceeds.

In the drawings:

Figure 1 is an axial section of an embodiment of this invention;

Figure 2 is an isometric view of one component of the coupling of Figure 1;

Figure 3 is an isometric illustration of the other component of the coupling of Figure 1; and Figure 4 is an alternative arrangement for altering the center of gravity of the auxiliary wheel of Figure 1.

Referring to the drawings and more particularly to Figure 1, a stationary hollow axle 10 is adapted to be permanently attached at its left end to a landing gear element (such as a shock strut, not shown). A rigid mounting flange 12 may be secured adjacent this left end for convenient attachment to such landing gear element and serve as an abutment for a spacer ring 14 which serves to space an anti-friction bearing 16 from said flange. Axially spaced to the right of bearing 16 is another anti-friction bearing 18, both of these bearings serving to rotatably support wheel 20 on axle 10. Outwardly facing radial bearing shoulders 22 and 24 engage right and left radial portions of bearings 16 and 18 respectively so that leftward pressure on bearing 18 by means of the hub nut 25 threaded on the right-hand end of axle 10 will result in the wheel and bearings being retained in assembled position on axle 10.

A tubular reinforcement member 26 is mounted interiorly of axle 10 with a force fit and serves the purpose of making axle 10 more rigid. This part could be eliminated by making the wall thickness of axle 10 sufficiently great to withstand specified loads; however, it serves as a convenient expedient for reinforcing axle 10 and another purpose to be explained hereafter.

This tube 26 may be further secured to axle 10 and against relative movement with respect thereto by means of a tight-fitting pin 28 which passes through the walls thereof.

A fastening or hanger block 30 (see Figure 2) is supported on the end of a hollow cylinder 32 which is press fitted inside the reinforcement tube 26 and is held against rotational movement with respect to axle 10 and tube 26 by means of a key 34 which slidably fits companion grooves 36 and 38 in the tube 26 and cylinder 32 respectively. This block 30 is axially secured in place, by the use of a relatively long, through bolt 40 which passes through block 30 and is screwed into a threaded opening 42 of a wall 44 formed integrally with the internal tube 26.

As will be seen more clearly in Figure 2, the opposite lateral surfaces 46 and 48 of block 30 are upright and are substantially parallel. The top side 50 of block 30 is formed flat and generally horizontal for a purpose which will become apparent hereafter. The lower portion 52 of block 30 is part cylindrical and is provided with laterally projecting trunnions 54. The front or axially outer face 56 of block 30 is generally flat and may be regarded as an abutment surface which serves a purpose hereinafter defined.

To the right of axle 10 and coaxial therewith is an auxiliary axle 58 upon which is rotatably mounted an auxiliary wheel 60 by means of axially spaced anti-friction bearings 62, this wheel 60 having, in the illustrated version, about the same load-carrying capacity as does wheel 20.

On the left end of axle 58 is provided a connector generally indicated by the reference number 64 which may be detachably interlocked with the hanger block 30 in such a manner as to support both wheels 20 and 60 about the same axis of rotation. This connector 64 may be formed integral with axle 58 and has extending axially toward block 30 from the upper portion thereof a pair of horizontally spaced guide lugs 66 and 68 which slidably engage for vertical movement the lateral surfaces 46 and 48 respectively of hanger block 30. The inset surface 70 between these lugs is adapted to slidably engage the aforementioned abutment surface 56. Spaced downwardly from the lugs 66 and 68 is a pair of upwardly opening hooks 72, preferably formed as an integral part of the connector 64, which receive in the cradle portions thereof respective trunnions 54. Thus when both wheels 20 and 60 are supported on a ground surface, the tendency of the axle 58 to pivot about trunnions 54 in a counterclockwise direction causes firm abutting engagement of the two surfaces 56 and 70 and a positive load-supporting connection between the two axles 10 and 58.

A small plate 74 is secured to the top side of connector 64 by means of bolts 76 or the like and projects in the direction of lugs 66, 68 a distance sufficient to slidably engage a portion of the upper surface 50 of block 30.

In use, the present invention is attached to the lower extremity of a strut member depending from the aircraft and both wheels 20 and 60 engage the ground surface and support proportional shares of the aircraft's weight. As explained above, the auxiliary wheel 60 and axle 58 are interlocked with the main axle 10 by reason of the tendency of axle 58 to pivot counterclockwise about the trunnions 54. This same interlocking connection provides for the transfer of the load acting downwardly at the trunnions 54 to the auxiliary axle 58 thereby distributing the total load imposed on the left end of axle 10 to both wheels 20 and 60.

Since a principal purpose of this invention is to provide this auxiliary construction for take-offs only, it is obviously desirable to provide means for detachment of this auxiliary gear when the aircraft becomes air-borne. Such detachment can be adapted to occur automatically by the use of the interlocking coupling above described without wheel 60 ever leaving the ground, in the present embodiment. The wheel upon detachment can then roll until its momentum is dissipated. This detachment occurs in the following manner. As the plane becomes air-borne, the weight of the plane and its load shifts from the undercarriage gear to the plane's wings. The moment this occurs and the wheel 20 leaves the runway, the wheel 60 and axle 58 pivot clockwise about the trunnions 54. When the wheel 20 has risen sufficiently, the lugs 66, 68 and the plate 74 pivot out of engagement with the block 30, and as the plane's altitude progressively increases the trunnions 54 are merely lifted free of the hooks 72 thereby completely detaching wheel 60 from the plane.

Should the plane hit a downdraft before plate 74 has broken engagement with block surface 50, and drop to the runway, the trunnions 54 will fall back into engagement with the hooks 72 and cause the two axles to be interlocked once again thereby providing reasonable assurance that the load-carrying function of the auxiliary gear will be available until the plane becomes truly air-borne.

It is considered desirable that after the auxiliary wheel leaves the plane that it either roll in a straight line or veer away from the plane thereby avoiding the possibility of the auxiliary wheel crashing into some part of the plane's undercarriage or fuselage. As shown in Figure 1, the center of gravity of the auxiliary wheel and axle combination may be too far to the left by reason of the weight of the connector 64. If this should be true, the wheel 60 (if on the outboard side) would tend to turn toward the plane after its detachment. By providing a counterbalance weight 78 (see Figure 4), made of any suitable material such as cast iron, lead, etc., in the right end of the axle 58, the center of gravity of the assembly may be shifted to the right thereby affording the desired obstructing-free line of travel of the assembly. Such a counterbalance weight may be secured in position by means of a bolt 80 which is threadedly received in a wall 82 formed integral with axle 58.

The present invention in the form of the foregoing description is especially useful on aircraft which carry heavy loads of fuel to be normally consumed in flight or relatively heavy cargo which is normally delivered overboard during flight. In either or both load conditions, the gross landing weight of the aircraft is considerably less than the gross take-off weight hence the necessity of having an auxiliary load-supporting undercarriage only during take-off. Obviously, with the gross weight substantially diminished by the consumption of the fuel and/or by the air-delivery of the cargo, such auxiliary gear is not needed for landing.

A further utility is found in the fact that complete detachment of the auxiliary gear eliminates the necessity of providing cavity space in either the wings or fuselage which would normally be occupied by such gear if it were permanently affixed. This obviously simplifies the matter of providing for the retraction of the entire undercarriage.

By the complete release of the auxiliary gear, the gross take-off weight of the aircraft is decreased during take-off thereby increasing the craft's flotation which is usually accompanied by an increase in speed and range of travel.

Another significant result achieved by the use of this invention is the use of relatively low tire pressures for the main and auxiliary wheels. With this arrangement, the requisite tire support for take-off loads is provided, and a cushioning, relatively low tire pressure gear is available to absorb the initial shock of landing.

Although only two embodiments of the invention have been illustrated and described, various changes in the form and relative arrangements of the parts may be made to suit requirements.

I claim:

1. An undercarriage assembly for use on aircraft comprising a stationary hollow axle adapted to be secured to an aircraft and having an open outer end, a wheel rotatably supported on said axle by means of two axially spaced anti-friction bearings, a hub nut threadedly received on the aforementioned outer end of said axle and arranged to secure said wheel in position on said axle, a reinforcement tube received interiorly of said axle for the purpose of rigidifying said axle, said tube having a wall between its ends which is provided with a threaded opening, fastening means securing said tube and said axle against relative movement, a hanger block having two opposite vertical and substantially parallel sides and being provided with trunnions which extend laterally from said sides, a mounting cylinder extending from said hanger block substantially at right angles to said trunnions, said mounting cylinder fitting inside said reinforcement tube a distance which allows said block to abut said outer end of said axle, a through bolt passing through said block and being threaded into said wall thereby rigidly securing said block in position, and a non-rotatable auxiliary axle having a wheel rotatably supported thereon and having a connector on one end thereof arranged to be interlocked with said hanger block in such a manner that said auxiliary axle will extend substantially coaxially outwardly from the outer end of said stationary axle, said connector having a pair of laterally spaced guide lugs provided on the upper portion thereof which are arranged to straddle said block and slidably engage said sides and a plate which slidably engages a portion of the top side of said block, and a pair of upwardly opening hooks provided on said connector immediately below said lugs and arranged to receive said trunnions, the lugs and hooks on said connector detachably connecting said axles together when said wheels are engaging the ground surface, and providing for the automatic release of said auxiliary axle from said stationary axle when the latter is lifted out of operative engagement with the ground.

2. An undercarriage assembly for use on aircraft comprising a hollow main stationary axle adapted to be secured to an aircraft and having an open outer end, a main wheel rotatably supported on said axle, a hub nut threadedly received on the aforementioned outer end and arranged to position said wheel on said axle, a wall having a threaded opening and secured to the interior of said axle at a point spaced inwardly from said outer end, a hanger block having a mounting cylinder which fits into said outer end, a through bolt which passes through said hanger block and which is received in the threaded opening in said wall thereby securing said block to said axle, the lateral sides of said block being substantially parallel and vertical, a pair of trunnions extending laterally from said sides, a non-rotatable auxiliary axle having a wheel rotatably supported thereon and having a connector on one end which interlocks with said hanger block whereby said auxiliary axle may coaxially extend from said main axle, said connector having a pair of laterally spaced guide lugs provided on the upper portion thereof which are arranged to straddle said block and slidably engage said sides, and a pair of upwardly opening hooks provided on said connector immediately below said lugs and arranged to receive said trunnions, the lugs and hooks on said connector detachably connecting said axles together when said wheels are engaging the ground surface, and providing for the automatic release of said auxiliary axle from said main axle when the latter is lifted out of operative engagement with the ground.

3. An undercarriage assembly for use on aircraft comprising a hollow main stationary axle adapted to be secured to an aircraft and having an open outer end, a main wheel rotatably supported on said axle, hub means received on the aforementioned outer end and arranged to position said wheel on said axle, a hanger block secured to the outer end of said axle and having a portion extending inside said axle, said block having lateral sides which are substantially parallel and vertical, a pair of trunnions extending laterally from said sides, a non-rotatable auxiliary axle having a wheel rotatably supported thereon and having a connector on one end which interlocks with said hanger block whereby said auxiliary axle may coaxially extend from said main axle, said connector having a pair of laterally spaced guide lugs provided on the upper portion thereof which are arranged to straddle said block and slidably engage said sides, and a pair of upwardly opening hooks provided on said connector immediately below said lugs and arranged to receive said trunnions, the lugs and hooks on said connector detachably connecting said axles together when said wheels are engaging the ground surface, and providing for the automatic release of said auxiliary axle from said main axle when the latter is lifted out of operative engagement with the ground.

4. An undercarriage assembly for use on aircraft comprising a hollow main stationary axle adapted to be secured to an aircraft and having an open outer end, a main wheel rotatably supported on said axle, hub means received on the aforementioned outer end and arranged to position said wheel on said axle, a hanger block secured to the outer end of said axle and having a portion extending inside said axle, a pair of trunnions extending laterally from said sides, a non-rotatable auxiliary axle having a wheel rotatably supported thereon and having a connector on one end which interlocks with said hanger block whereby said auxiliary axle may coaxially extend from said main axle, said connector having a pair of laterally spaced guide lugs which are arranged to straddle said block and slidably engage said sides and a pair of upwardly opening hooks arranged to receive said trunnions, said hooks, and trunnions serving to detachably connect said axles together when said wheels are engaging the ground surface, and providing for release of said auxiliary axle from said main axle when the latter is detached from operative engagement with the ground.

5. An undercarriage assembly for use on aircraft comprising a main axle adapted to be secured to an aircraft, a main wheel rotatably supported on said axle, a hanger block secured to the outer end of said axle and having a pair of trunnions extending horizontally from opposite lateral sides thereof, an auxiliary axle having a wheel rotatably supported thereon and having a connector which interlocks with said hanger block whereby said auxiliary axle may axially extend from said main axle, said connector having a pair of upwardly opening hooks arranged to receive said trunnions, said hooks and trunnions serving to detachably interconnect said axles when said wheels are engaging the ground surface and providing for the release of said auxiliary axle from said main axle when the latter is detached from operative engagement with the ground.

6. An undercarriage assembly for use on aircraft comprising a main axle adapted to be secured to an aircraft, a main wheel rotatably supported on said axle, a hanger block secured to the outer end of said axle, and an auxiliary axle having a wheel rotatably supported thereon and having a connector which interlocks with said hanger block whereby said auxiliary axle may axially extend from said main axle, said connector in cooperation with said hanger block being so arranged that said main and auxiliary axles are detachably connected together to provide for the release of said auxiliary axle from said main axle when the latter is detached from operative engagement with the ground.

7. An undercarriage assembly for use on aircraft comprising a main axle adapted to be secured to an aircraft, a hanger block secured to the end of said axle, an auxiliary axle having a connector which interlocks with said hanger block whereby said auxiliary axle may axially extend from said main axle, said connector in cooperation with said hanger block serving to detachably connect said axles together when said axles operatively engage the ground surface and providing for the release of said auxiliary axle from said main axle when the latter is detached from operative engagement with the ground.

8. An undercarriage for use on an aircraft comprising a main axle adapted to be secured to an aircraft, an auxiliary axle arranged to be detachably connected to said main axle so as to axially extend therefrom, and means providing said detachable connection comprising a first portion provided on one end of said main axle having substantially parallel vertical sides and an abutment surface on the outer face thereof, a pair of trunnions extending horizontally from said sides, a second portion provided on one end of said auxiliary axle and having a pair of horizontally spaced guide lugs thereon arranged to vertically slide on respective sides of said first portion, said second portion having an overhanging ledge which slidably engages an upwardly exposed part of said first portion, and said second portion further having a pair of upwardly opening hooks disposed below said lugs and arranged to receive respective ones of said trunnions, the outer surface of said second portion engaging the aforementioned abutment surface, said axles thereby being joined together as one and against relative rotation when the remote end sections of said axles are vertically supported but being detached from each other when only the main axle receives vertical support.

9. An undercarriage for use on an aircraft comprising a main axle adapted to be secured to an aircraft, an auxiliary axle arranged to be detachably connected to said main axle so as to axially extend therefrom, and means providing said detachable connection comprising a first portion provided on one end of said main axle having substantially vertical sides and an abutment surface on the outer face thereof, a pair of trunnions extending horizontally from said sides, a second portion provided on one end of said auxiliary axle and having a pair of horizontally spaced guide lugs thereon arranged to vertically slide on respective sides of said first portion, and said second portion further having a pair of upwardly opening hooks disposed below said lugs and arranged to receive respective ones of said trunnions, the outer surface of said second portion engaging the aforementioned abutment surface, said axles thereby being joined together as one and against relative rotation when the remote end sections of said axles are vertically supported but being detached from each other when only the main axle receives vertical support.

10. An undercarriage for use on an aircraft comprising a main axle adapted to be secured to an aircraft, an auxiliary axle arranged to be detachably connected to said main axle so as to axially extend therefrom, and means providing said detachable connection comprising a first portion provided on one end of said main axle having an abutment surface on the outer face thereof, a pair of trunnions extending horizontally from said first portion, a second portion provided on one end of said auxiliary axle and having a pair of upwardly opening hooks arranged to receive respective ones of said trunnions, the outer surface of said second portion engaging the aforementioned abutment surface, said axles thereby being joined together as one when the remote end sections of said axles are vertically supported but being detached from each other when only the main axle receives vertical support.

11. An undercarriage for use on an aircraft comprising a main axle adapted to be secured to an aircraft, an auxiliary axle arranged to be detachably connected in fixed relation with respect to said main axle so as to axially extend therefrom, and means providing said detachable connection comprising a first portion provided on one end of said main axle arranged to take an upwardly directed supporting force, a second portion detachably interlocked with said first portion and having means arranged to receive an upwardly directed supporting force from said first portion, said detachable connecting means serving to release and separate said auxiliary axle from said main axle when said main axle becomes air-borne.

12. For use in cooperation with the principal landing gear of an aircraft, an auxiliary wheel and axle assembly arranged to be detachably coupled to the principal landing gear and thereby support a proportionate share of the total landing gear load, a coupling device on one end of said axle which forms a part of the aforementioned detachable coupling, and a weight provided on the other end of said axle serving to counterbalance the weight of said coupling device.

FRANKLIN C. ALBRIGHT.

References Cited in the file of this patent

UNITED STATES PATENTS

| Number | Name | Date |
|---|---|---|
| 2,317,906 | Garnett | Apr. 27, 1943 |
| 2,425,886 | Knox | Aug. 19, 1947 |